（12) United States Patent
Roth

(10) Patent No.: US 9,120,229 B2
(45) Date of Patent: Sep. 1, 2015

(54) ROBOT ARM

(71) Applicant: KUKA Roboter GmbH, Augsburg (DE)

(72) Inventor: Stefan Roth, Eisenbrechtshofen (DE)

(73) Assignee: KUKA Roboter GmbH, Augsburg (DE)

( * ) Notice: Subject to any disclaimer, the term of this patent is extended or adjusted under 35 U.S.C. 154(b) by 138 days.

(21) Appl. No.: 14/104,643

(22) Filed: Dec. 12, 2013

(65) Prior Publication Data

US 2014/0165771 A1 Jun. 19, 2014

(30) Foreign Application Priority Data

Dec. 13, 2012 (DE) .......................... 10 2012 223 063

(51) Int. Cl.
| B25J 9/04 | (2006.01) |
| B25J 18/00 | (2006.01) |
| B25J 9/00 | (2006.01) |
| B25J 9/08 | (2006.01) |

(52) U.S. Cl.
CPC ................ *B25J 18/00* (2013.01); *B25J 9/0018* (2013.01); *B25J 9/047* (2013.01); *B25J 9/08* (2013.01); *Y10S 901/23* (2013.01); *Y10T 74/20311* (2015.01); *Y10T 74/20317* (2015.01)

(58) Field of Classification Search
CPC .............. B25J 9/046; B25J 9/047; B25J 9/06; B25J 9/0018; B25J 19/0025
See application file for complete search history.

(56) References Cited

U.S. PATENT DOCUMENTS

| 4,690,012 A | * | 9/1987 | Dahlquist et al. ................ 901/26 |
| 4,787,270 A | * | 11/1988 | Suica ............................. 414/735 |
| 4,904,148 A | * | 2/1990 | Larsson ......................... 414/680 |
| 5,887,800 A | * | 3/1999 | McClosky ....................... 901/43 |
| 7,137,578 B2 | * | 11/2006 | Steingass et al. .............. 285/912 |
| 7,622,001 B2 | * | 11/2009 | Inada et al. ...................... 901/43 |
| 2006/0288550 A1 | * | 12/2006 | Johansson .......................... 29/53 |
| 2011/0257786 A1 | * | 10/2011 | Caron L'Ecuyer et al. .... 901/28 |

FOREIGN PATENT DOCUMENTS

| CA | 2497250 A1 | 8/2006 | |
| DE | 3026273 A1 | 2/1981 | |
| DE | 4137894 A1 * | 5/1992 | ............... B23Q 7/02 |
| DE | 44 31 842 C2 | 3/1996 | |
| DE | 11 2004 001 014 T5 | 4/2006 | |
| JP | H01149285 U | 10/1989 | |

OTHER PUBLICATIONS

German Patent Office; Search report in German Patent Application No. 10 2012 223 063.7 dated Aug. 20, 2013; 5 pages.
European Patent Office; Saerch Report in European Patent Application No. 13195579.1 dated Mar. 6, 2014; 6 pages.

* cited by examiner

*Primary Examiner* — Gerald McClain
(74) *Attorney, Agent, or Firm* — Wood, Herron & Evans, LLP

(57) ABSTRACT

The invention is concerning a robotic arm that features several consecutive mobile links and motors associated with axes relative to one another for the moving of the links. At least one of the links is selectively mountable in at least two configurations relative to its adjacent links.

9 Claims, 3 Drawing Sheets

ROBOT ARM

TECHNICAL FIELD

The present invention relates to a robotic arm.

BACKGROUND

Robotic arms generally incorporate several, consecutively arranged links connected by joints and electrical motors in order to move the links relative to one another. The particular links are a stationary or mobile frame and a rotating carousel mounted around a first rotation axis relative to the frame.

Further links of a robotic arm, for instance, are a link arm, an arm and a preferentially polyaxial robotic hand with, e.g. a mounting device designed as a flange for the mounting of an end effector. The link arm is swivel-mounted to the bottom end, e.g. to a link arm bearing head on the carousel around a second rotation axis. On the upper end of the link arm, the arm is in turn swivel-mounted around a third rotation axis, whereby the second and third axes are arranged parallel to each other. The same is carrying the robotic hand at the end with its preferentially three rotation axes.

SUMMARY

Purpose of the invention is to represent a variably mountable or modular robotic arm.

The purpose of the invention is being resolved by a robotic arm featuring several consecutive mobile links and motors in respect of rotation axes relative to one another for the moving of the links, whereby at least one of the links is optionally mountable in at least two configurations relative to its adjacent member. Based on the possibility according to the invention to optionally mount at least one of the links in at least two configurations relative to its adjacent member, the work space of the robotic arm, in respect of which the robotic arm is movable, is relatively simple to adjust to the desired application.

Preferentially the corresponding link can be mountable and detachable into different directions relative to its adjacent link. Then it is also possible to mechanically reconfigure or assemble the robotic arm according to the invention and in compliance with the application.

Following a preferential variant of the robotic arm according to the invention, the corresponding link relative to its adjacent link can be optionally mountable either into a first direction or into a second direction oriented on a mounting axis turned by 180 degrees, whereby the mounting axis is at a right angle to the rotation axis of the adjacent link.

The robotic arm according to the invention is a preferential part of a jointed-arm robot. One of the links is then preferentially formed as a link arm and another one of the links is formed as an arm. One rotation axis then represents a link arm axis, in respect of which the link arm is swivel-mounted onto one of its ends, and another rotation axis is an arm axis, in respect of which the arm is swivel-mounted relative to the other end of the link arm, whereby the link arm axis and the arm axis are running parallel to one another. The robotic arm can also feature a carousel which is mounted to turn relative to a first rotation axis in respect of a frame. The link arm can be swivel-mounted onto the carousel in respect of its link arm axis which in this case is then a second rotation axis. The arm axis then represents a third rotation axis.

Occasionally, robot manufacturers optimize the work area of the third rotation axis so that the work space of the robotic arm can be utilized productively in such a way that a main work area as well as an auxiliary work area can be relatively defined within the work room. The auxiliary work area of the work room which is situated on the other side of the arm relating to the third rotation axis, is thus, however, being limited.

When using the robotic arm on a ceiling (overhead installation) the so called overhead area of the robotic arm, however, is of particular benefit. Since otherwise either the link arm comes very close to the component or the range is limited due to subtraction of a typically existing offset of the second rotation axis from the first rotation axis.

When used as a compact robot, a robotic arm in accordance with the principles of the present invention can be of particular benefit by facilitating work in the main and auxiliary work area of the work space, or "in front" or "in back", because two alternative depths of range are available. These differ around double the offset of the first rotation axis from the second rotation axis. While this method is also possible with a symmetric third rotation axis, the same suffers to an unusual degree due to the interfering contours of the first rotation axis in the rearward state.

In accordance with one embodiment of the robotic arm according to the invention, the link that is optionally mountable in at least two configurations relative to its adjacent link, is the link arm, which is optionally mountable particularly with its end turned away from the arm in at least two configurations relative to a carousel, on which the link arm is arranged pivotably relative to the link arm axis. Because of this mounting option, an asymmetric optimized work space can be used towards both directions.

In one embodiment of the robotic arm according to the invention, the link that is mountable in at least two configurations relative to its adjacent link is the arm and the adjacent link is the link arm. Particularly if the arm, optionally relating to the mounting axis, can be mounted to turn by 180 degrees relative to the link arm, the mounting option creates the possibility to use an asymmetric optimized work space towards both directions.

The robotic arm according to the invention can feature a mounting device which is swivel-mounted relative to the arm axis on the link arm and on which the arm is optionally mountable in the at least two configurations relative to the link arm.

The possibility of the optional mounting of the arm relating to the mounting axis turned by 180 degrees can then be implemented relatively easy if following a variant of the robotic arm according to the invention where the first mounting device is designed in such a way that it features a mounting surface arranged radially to the arm axis and to a long axis of the arm in an angle of 45 degrees so that thereupon the arm is mountable around an imaginary axis turned by 180 degrees arranged in a right angle towards the mounting surface. Here the imaginary axis is corresponding to the mounting axis indicated before.

Further links of the robotic arm according to the invention can be formed as a robotic hand that features a second mounting device at the end for the mounting of an end effector which is mounted onto the end of the arm turned away from the link arm. The robotic hand incorporates preferentially three rotation axes, particularly a fourth rotation axis, a fifth rotation axis, and a sixth rotation axis. The long axis of the arm can then also be the fourth rotation axis.

The robotic hand assigned to the motors can preferentially be arranged in and/or on the end of the arm which is turned towards the link arm. The robotic arm according to the invention can then feature an electrical line connected with the motors of the robotic hand.

Particularly if the arm is optionally mountable in the at least two configurations relative to the motion link, and particularly either into the one direction or turned by 180 degrees relating to the mounting axis, the electrical cable connected with the motors of the robotic hand can centrically penetrate a designated mounting flange for the mounting of the arm on the first mounting device. The arm of the robotic arm according to the invention can however also feature two alternative feeds for the electrical cable, through which the electrical cable is optionally being lead to the connection on the motor of the robotic hand, depending on the mounting of the arm. The feeds in particular can be arranged on opposite side surfaces of the arm, particularly in the area of the motor of the robotic hand.

BRIEF DESCRIPTION OF THE DRAWINGS

A sample of the design of the invention is being illustrated as an example in the attached schematic drawings. They show.

DETAILED DESCRIPTION

Figure 1:
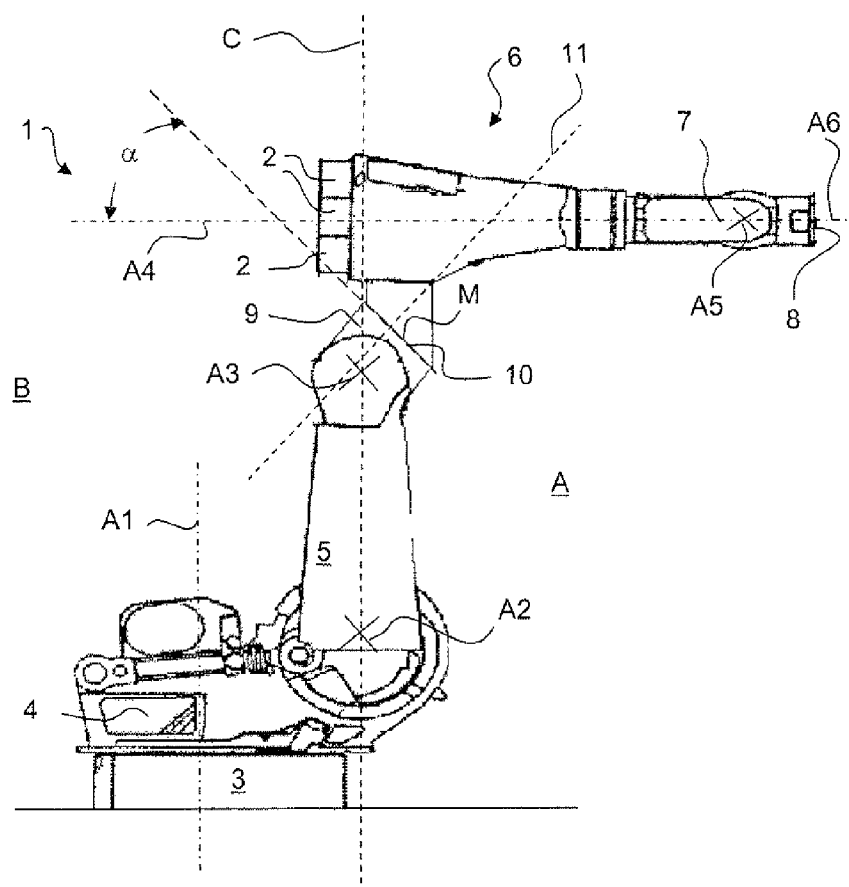
FIGS. 1 to 3: a robotic arm.
Figure 2:
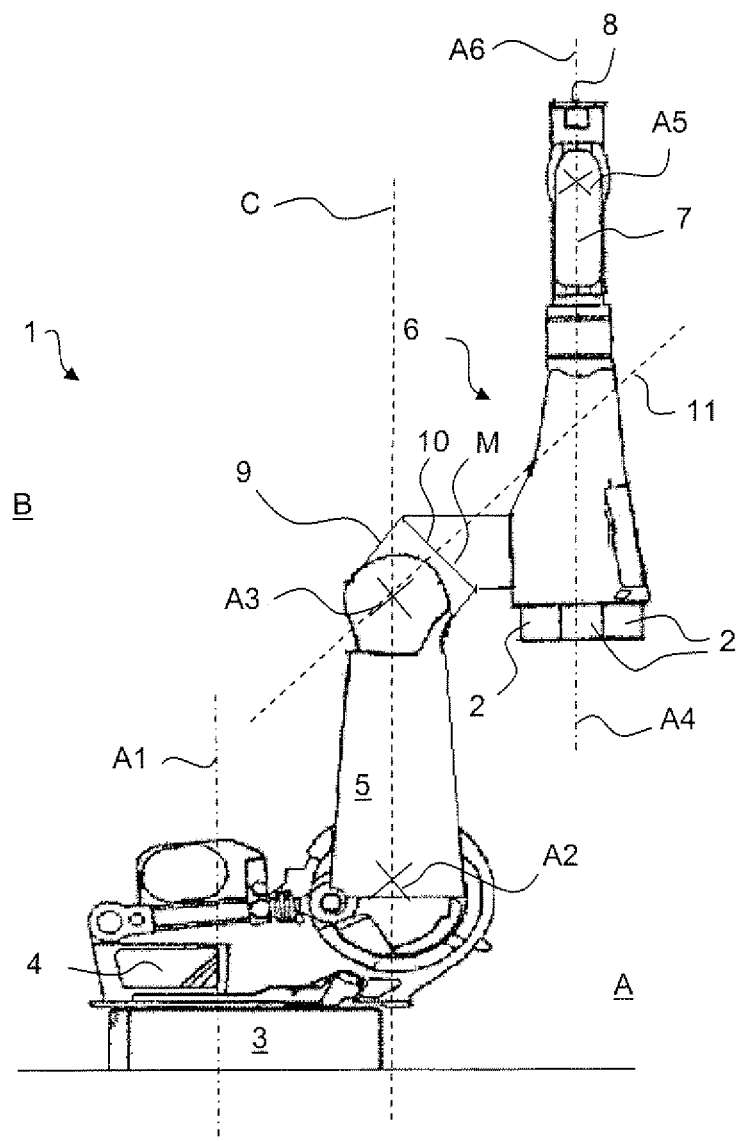
Figure 3:
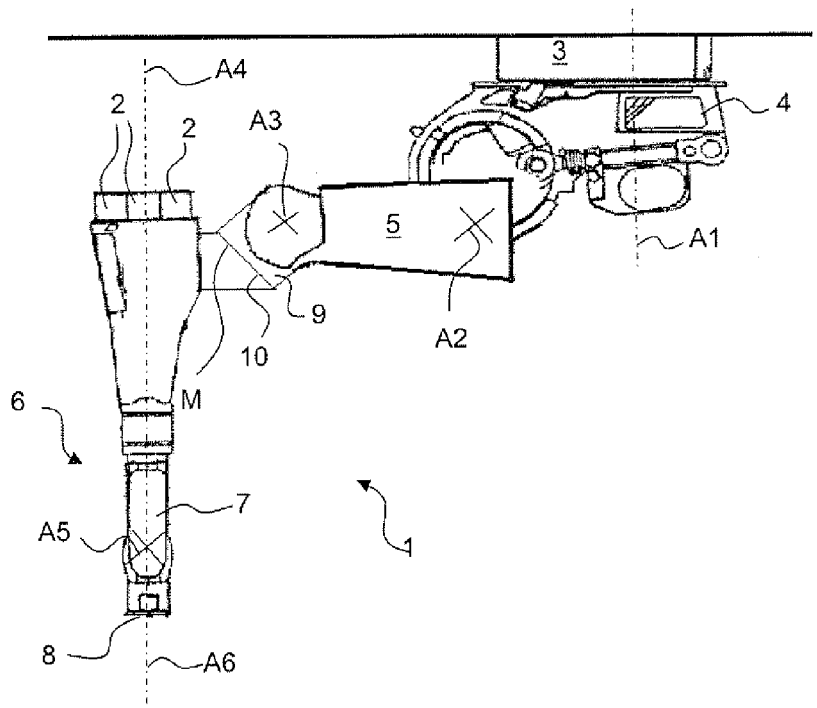

FIGS. 1 to 3 show a robotic arm 1 that incorporates several consecutively arranged links connected by joints.

The links in the case of the design example at hand are in particular a stationary or mobile frame 3 and a turntable carousel 4 mounted relative to the frame 3 around a first rotation axis A1. In the case of the design example shown in FIGS. 1 and 2, frame 3 is mounted on the bottom to a support surface.

Further links of the robotic arm 1 are, in the case of the design example at hand, a link arm 5, an arm 6, and a preferentially polyaxial robotic hand 7 with a mounting device, for instance, designed as flange 8 for the mounting of an end effector (not shown). The link arm 5 is swivel-mounted onto the lower end such as a not more closely illustrated link arm bearing head on the carousel 4 around a second rotation axis A. The arm 6 on the other hand is swivel-mounted onto the upper end of the link arm 5 around a third rotation axis A3. Arm 6 carries the robotic hand 7 at the end with its preferentially three rotation axes, namely a fourth rotation axis A4, a fifth rotation axis A5, and a sixth rotation axis A6. In the position of the robotic arm 1 shown in FIG. 1 the fourth rotation axis A4 and the sixth rotation axis A6 are colinear. Furthermore, the second rotation axis A2 and the third rotation axis A3 are arranged parallel to each other.

The robotic arm 1 in particular is part of a jointed-arm robot that next to the robotic arm 1 features a not closer illustrated control apparatus which is connected in a commonly known way, for instance, with electrical propulsions of the jointed-arm robot. In FIGS. 1 to 3, just a few of the electrical motors 2 of these electrical propulsions are shown which are mounted in and/or on the robotic arm 1. The electrical motors 2 shown in FIGS. 1 to 3 are designated for the moving of the robotic hand 7. Power electronics of the electrical propulsions are, for instance, arranged within a housing of a not closer illustrated control cabinet which, for instance, also contains the control apparatus. The power electronics of the electrical propulsions can also be arranged in and/or on the robotic arm 1. The electrical motors 2 of the robotic hand 7 are particularly arranged in and/or on the end of the arm 6 which is turned towards the link arm 5.

In the embodiment shown, the robotic arm 1 is designed in such a way that at least one of its links 3-7 can be mounted in at least two different configurations relative to its adjacent links 3-7. This link in particular can be mounted for the two different configurations either into a first direction or into a second direction relating to an imaginary mounting axis 11 turned by 180 degrees relative to its adjacent links 3-7. This is particularly provided for the link arm 5 and/or the arm 6. Here the imaginary mounting axis 11 is orthogonally arranged to the respective rotation axis A2 of the link arm 5 or rotation axis A3 of the arm 6.

In order to achieve, for instance, that the arm 6 relative to the link arm 5 is optionally mountable in two different configurations, particularly either optional into the first direction or into the second direction relating to the mounting axis 11 turned by 180 degrees, the robotic arm 1 in the embodiment shown incorporates a mounting device 9 which is arranged pivotally with respect to the third link arm A3 on the corresponding end of the link arm 5. The arm 6 on the other hand incorporates a corresponding mounting device 10 on its end turned towards the link arm 5 by which the arm 6 in particular is mountable on and detachable from the mounting device 9. The mounting device 9 and the corresponding mounting device 10 are designed in such a way that the arm 6 is optionally mountable in two different configurations on the mounting device 9. In both of these configurations the arm 6 relating to the mounting device 10 and therefore relating to the link arm 5 is optionally mountable and detachable either into the first direction or particularly into the second direction relating to the mounting axis 11 turned by 180 degrees. In the illustration shown in FIG. 1 the arm 6 is mounted in one of its orientations into the first direction on the mounting device 10 and in the illustration shown in FIG. 2 the arm 6 is mounted into the second direction relating to the first direction's mounting axis 11 turned by 180 degrees on the mounting device 10.

If, for instance, the work area of the robotic arm 1, meaning the area that the arm 6 can approach during operation with its flange 8, for instance, or a so called Tool Center Point, is being divided into a main work area A and a sub work area B that are separated by a level C, whereby level C is extends through the second rotation axis A2 and the third rotation axis A3, then depending on how the arm 6 is mounted onto the mounting device 9, the main work area A and the sub work area B of the work spaces can be adjusted to the application of the robot incorporating the robotic arm 1. The main and sub work areas A, B of the work space in particular can be swapped in accordance with the mounting of the arm 6 to the link arm 5.

In the exemplary embodiment shown in FIG. 1 the robotic arm 1 is designed in such a way that while performing a bottom installation the fourth rotation axis A4 is running above the third rotation axis A3. This arrangement provides more room for the interfering contours of the link arm 5 and the first rotation axis A1. Thus the main work area A becomes larger as illustrated in FIG. 1.

In the embodiment shown, the mounting device 9 is designed in such a way that it features a mounting surface M radially arranged to the third rotation axis A3 and to the fourth rotation axis A4 in an angle of 45 degrees so that the arm 6 thereupon can be mounted to turn by 180 degrees around the imaginary mounting axis 11. The robot incorporating the robotic arm 1 would then be convertible even without readjustment and could continue to be operated after software configuration.

A corresponding mounting of the arm 6 relating to the mounting axis 11 turned by 180 degrees as shown in FIG. 2 makes it possible according to the invention that the sub work area B is corresponding to the main work area A, i.e. the defined main and sub work areas A and B can be reversed.

The mounting of the arm 6 as per FIG. 2 can be advantageous, for instance, when installing the robotic arm 1 on a ceiling. A mounting of the robotic arm 1 with its frame 3 on a ceiling is shown in FIG. 3.

Figure 4:
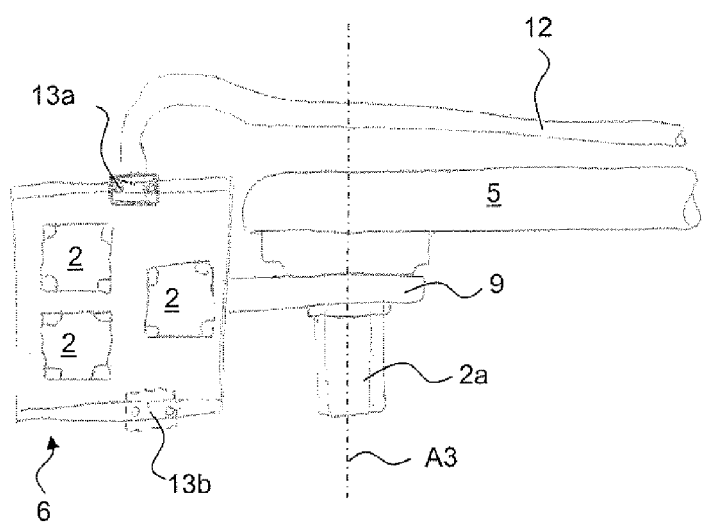
FIG. 4: a segment of the robotic arm.

In order to, for instance, provide the electrical motors 2 assigned to the robotic hand 7 with electrical energy, the robotic arm 1, for instance, incorporates an electrical line 12 shown in FIG. 4. FIG. 4 shows a segment of the robotic arm 1 in the area of the link arm 5 and of the arm 6. Here the electrical motor designated for the swivelling of the link arms 5 relating to the third rotation axis A3 is given the reference sign 2a.

For improved cable routing of this electrical cable 12 the mounting device 9 can be symmetrically shaped. This can be achieved, for instance, by the electrical cable 12 centrically penetrating a mounting flange provided for the mounting of the arm 6 to the mounting device 9.

But as is shown in FIG. 4, there can also be two ports 13a, 13b provided for the electrical cable 12 on the arm 6 through which the electrical cable 12, depending on the mounting of the arm 6, is optionally led to the connection on the motors 2 of the robotic hand 7. Both ports 13a, 13b are arranged on opposite side surfaces of the arm 6, particularly in the area of the motors 2 of the robotic hand 7.

What is claimed is:

1. A robotic arm, comprising:
   a plurality of serially-arranged, movable links coupled to one another at respective joints defining respective rotation axes about which the links are movable; and
   a plurality of motors associated with the links for moving the links about the rotation axes;
   wherein at least one of the links is selectively mountable to an adjacent link in at least two different configurations;
   wherein one of the links is a link arm that is pivotally movable about a first axis; and
   wherein another one of the links is an arm pivotally coupled to the link arm for rotation about a second axis parallel to the first axis; and
   a first mounting device that is swivel mounted on the link arm with respect to the second axis;
   the arm being selectively mounted in the at least two configurations on the first mounting device;
   wherein the first mounting device comprises a mounting surface radially spaced from the second axis and inclined at about 45 degrees relative to a longitudinal axis of the arm, whereby the arm is mountable in a first direction and second direction 180 degrees apart from the first direction relative to an imaginary axis that is orthogonal to the mounting surface.

2. The robotic arm of claim 1, wherein the at least one link is selectively detachably mountable to the adjacent link in different directions.

3. The robotic arm of claim 1, wherein the at least one link is selectively mountable to the adjacent link in a first direction or a second direction, the second direction being 180 degrees apart from the first direction relative to an imaginary axis that is orthogonal to the rotation axis of the adjacent link.

4. The robotic arm of claim 1, wherein:
   one of the plurality of links is a carousel that is swivelly movable about a third axis;
   the at least one link is the link arm; and
   a first end of the link arm is selectively mountable in at least two different configurations to the carousel, relative to which the link arm is pivotally movable about the first axis.

5. The robotic arm of claim 1, wherein the at least one link is the arm, and the adjacent link is the link arm.

6. The robotic arm of claim 1, further comprising:
   a robotic hand coupled at a first end to the arm and having a second mounting surface at a second end for mounting an end effector; and
   wherein motors associated with moving the robotic hand are coupled to an end of the arm opposite the robotic hand.

7. The robotic arm of claim 6, further comprising:
   an electric cable operatively coupled with the motors of the robotic hand;
   the electric cable extending though a mounting flange for mounting the arm on the first mounting device.

8. The robotic arm of claim 1, further comprising:
   an electric cable operatively coupled with the motors of the robotic hand; and
   first and second ports on the arm for receiving the electric cable for coupling to the motors of the robotic hand;
   wherein the electric cable extends through one of the first or second ports, depending on the configuration.

9. The robotic arm of claim 8, wherein the first and second ports are disposed on oppositely facing side surfaces of the arm.

* * * * *